United States Patent
Kroboth

(10) Patent No.: US 12,018,636 B1
(45) Date of Patent: Jun. 25, 2024

(54) BUCKET ASSEMBLY WITH CONTAINMENT FLAP FOR GRAVITY-TYPE HYDROPOWER APPARATUS

(71) Applicant: Anthony F. Kroboth, Lehighton, PA (US)

(72) Inventor: Anthony F. Kroboth, Lehighton, PA (US)

( * ) Notice: Subject to any disclaimer, the term of this patent is extended or adjusted under 35 U.S.C. 154(b) by 0 days.

(21) Appl. No.: 18/325,945

(22) Filed: May 30, 2023

Related U.S. Application Data

(60) Provisional application No. 63/346,583, filed on May 27, 2022.

(51) Int. Cl.
    *F03B 7/00* (2006.01)

(52) U.S. Cl.
    CPC ............. *F03B 7/003* (2013.01); *Y02E 60/16* (2013.01)

(58) Field of Classification Search
    CPC ........ F03B 7/003; F03B 17/065; F03B 13/06; F03B 17/00–068; F03B 1/00; Y02E 10/20; Y02E 60/16; Y10S 415/916
    USPC .......................................................... 60/639
    See application file for complete search history.

(56) References Cited

U.S. PATENT DOCUMENTS

| | | | |
|---|---|---|---|
| 1,525 A * | 3/1840 | Robbins | ............... F03B 7/003 416/237 |
| 5,678 A | 7/1848 | Barnes | |
| 8,430 A | 10/1851 | Sheetz | |
| 10,299 A | 12/1853 | Whitemore | |
| 49,114 A | 8/1865 | Jamison | |
| 52,259 A | 1/1866 | Bell | |
| 73,400 A | 1/1868 | Snodgrass | |
| 98,392 A | 12/1869 | Lowden | |
| 181,365 A | 8/1876 | Sayre | |
| 198,728 A | 12/1877 | Gothard | |
| 272,592 A | 2/1883 | Smith | |
| 322,879 A | 7/1885 | Wingo | |
| 329,351 A | 10/1885 | Williamson | |
| 607,246 A | 7/1898 | Johnson | |
| 612,554 A | 10/1898 | Strauss | |

(Continued)

FOREIGN PATENT DOCUMENTS

| | | | |
|---|---|---|---|
| AU | 3207595 A | 3/1997 | |
| BR | PI0600717 A * | 10/2007 | ............. F03B 17/00 |

(Continued)

*Primary Examiner* — Wesley G Harris
(74) *Attorney, Agent, or Firm* — Wilkinson Law Office; Clinton H. Wilkinson

(57) ABSTRACT

The invention relates to a water wheel having a plurality of circumferentially mounted buckets adapted to receive fluid, each of the buckets having a pivotable containment flap for maintaining the fluid in the buckets for a longer period during downward rotation of the wheel. The containment flaps comprise a buoyant material such that the flaps will float on top of the fluid housed in the buckets. In an embodiment, the buckets are mounted on tracks such that when filled with fluid and rotated on the wheel to a downward angle the buckets will slide radially outwardly, producing added force and power to the wheel and increasing the mechanical energy which is generated. A means for moving the buckets to a retracted position when empty such as heavy spring or elastic cord members or strut is also provided. In combination, the slide and flap increase the power of the wheel.

20 Claims, 4 Drawing Sheets

(56) References Cited

U.S. PATENT DOCUMENTS

| | | | |
|---|---|---|---|
| 1,306,222 A | 6/1919 | Fent et al. | |
| 1,773,010 A | 8/1930 | Rixe | |
| 1,813,107 A | 7/1931 | Allner | |
| 2,503,832 A | 4/1950 | McCune | |
| 2,655,163 A | 10/1953 | Lyman | |
| 3,860,355 A * | 1/1975 | Dell | F03B 17/02 60/446 |
| 3,958,130 A | 5/1976 | Van Mechelen | |
| 4,253,795 A | 3/1981 | McQueen | |
| 4,260,902 A | 4/1981 | Crider | |
| 4,280,789 A * | 7/1981 | Graden | F03B 17/065 415/6 |
| 4,385,497 A * | 5/1983 | Scott | F03B 7/003 416/101 |
| 5,440,175 A | 8/1995 | Mayo, Jr. et al. | |
| 6,210,113 B1 | 4/2001 | Ihrenberger | |
| 6,237,342 B1 | 5/2001 | Hurford | |
| 9,890,761 B2 | 2/2018 | Kasten | |
| 2012/0001433 A1 | 1/2012 | Mowad | |
| 2012/0248787 A1 * | 10/2012 | Reist | F03B 7/006 290/1 R |
| 2021/0062778 A1 * | 3/2021 | Wu | F03B 13/06 |

FOREIGN PATENT DOCUMENTS

| | | | | |
|---|---|---|---|---|
| CN | 111425330 A * | 7/2020 | | F03B 1/00 |
| DE | 202009000184 U1 | 4/2009 | | |
| ES | 2264351 B1 * | 12/2007 | | F03B 17/00 |
| FR | 376273 A | 8/1907 | | |
| FR | 1078558 A | 11/1954 | | |
| FR | 2439310 A1 | 5/1980 | | |
| FR | 3086979 A1 | 4/2020 | | |
| JP | 56027074 A | 3/1981 | | |
| JP | 01010669 B | 2/1988 | | |
| JP | 2013087650 A | 5/2013 | | |
| KR | 20200140625 A * | 12/2020 | | F03B 11/00 |
| WO | WO-2009095196 A1 * | 8/2009 | | F03B 17/04 |
| WO | 2012135982 A1 | 10/2012 | | |

* cited by examiner

BUCKET ASSEMBLY WITH CONTAINMENT FLAP FOR GRAVITY-TYPE HYDROPOWER APPARATUS

CROSS-REFERENCE TO RELATED APPLICATIONS

This application claims priority from U.S. Provisional Application Ser. No. 63/346,583 filed on May 27, 2022, the entire disclosure of which is hereby incorporated herein by reference.

FIELD OF THE INVENTION

The present invention relates to hydropower generating devices and renewable energy sources generally, and more particularly to bucket assemblies for gravity-type hydropower devices.

BACKGROUND OF THE INVENTION

There is an increasing demand for small or micro hydropower systems which are an important source of renewable energy and electricity generation throughout the world. Hydroelectric power is considered a comparatively clean, affordable, and durable renewable power source. Gravity-type water wheel machines are one form of hydropower generating device typically having a plurality of buckets (or troughs, containers, paddles, blades, vanes, etc.) regularly distributed on supports or spokes around the periphery of a horizontally arranged wheel axle, which in turn is often connected to a generator for converting mechanical energy to electricity. Overshot water wheels take advantage of the potential energy of moving or falling water, transforming it into rotational energy by introducing the fluid flow into buckets or against blades at the terminal end of the high head. In bucket-style wheels, the buckets are sequentially filled with fluid, and the downward force and gravitational weight of the fluid generates a hydrostatic force which rotates the wheel axle and causes the wheel to turn in a direction such that the fluid-filled buckets are sequentially lowered. The particulars of overshot wheels such as the diameter, bucket dimensions, number of buckets, rotation speed, etc. are largely dictated by environmental variables such as the available "head" or how far the water falls, the volume of water, and flow rate, as well as the overall design.

In order to maximize the rotational power and force generated by the wheel, as much of the fluid as possible should remain in the downwardly rotating buckets until the buckets are at or near the lowest position of the wheel without rotating past the lowest position. Loss of water weight before the bucket reaches the lowest position of the wheel will reduce the efficiency and torque generated by the rotating wheel. Various arrangements have been devised to try to maintain the water in the buckets to be released at or just prior to the lowest position of the wheel. One solution is to mount the buckets to the wheel frame on axles or pivots so they will remain substantially horizontal while rotating downwardly, and then providing a tipping arrangement or structure. In other solutions, the bucket or trough floor is inclined so the water is progressively emptied, or a gate or door that opens near the bottom of the wheel to release the water is provided.

U.S. Pat. No. 8,430 to Sheetz discloses an overshot water wheel assembly having a series of circumferential inclined buckets and a gate structure positioned over each bucket opening. The gate structure has a rectangular frame which pivotably supports a gate attached to a top member of the frame, and the side members of the frame are secured by pivots. As the wheel is rotated, both the frame and gate are able to swing in the bucket opening to allow the bucket to be filled near the top of the wheel and to retain water in the bucket as the bucket rotates downwardly. The repeated swinging and contacting of the frame and gate against the inclined bucket as the wheel turns causes significant wear and tear on the gate structure and pivots.

Other arrangements therefore all require additional mechanisms to release the water from the buckets, such as a crank attached to the buckets which is received in a track, a tilting arm and surface, etc. There is therefore a remaining need for improvements in the overall efficiency of a water wheel assembly in which during the downward rotation of the wheel a greater mass of water remains in the bucket longer, without requiring an additional actuator or other arrangement to reset a gate or flap comprising part of the bucket.

In addition, the downward torque or turning force generated by rotation of the wheel can be increased by temporarily increasing the length of the bucket support or lever arm, to increase the distance of the descending buckets from the wheel axle. Various mechanical arrangements for moving a water wheel bucket radially outwardly as the bucket descends, as well as moving the bucket radially inwardly and decreasing the support arm length or returning it to the original length after the buckets have been emptied as the buckets ascend again to the top of the wheel to be refilled, have been proposed. In some embodiments, changing of the pivot arm length may be accomplished by moving or shifting the water mass outside of the wheel dimensions. In some of such arrangements, opposite buckets are provided on a single, slidable support arm, such that as a water-filled bucket is moved radially outwardly or extended, the opposite ascending bucket is moved radially inwardly or retracted. There thus remains a need for improvements in hydropower wheel assemblies and wheel bucket assemblies.

BRIEF SUMMARY OF THE INVENTION

The present invention is directed to a hydropower generating apparatus which in some embodiments is in the form of a water wheel assembly for converting the kinetic energy of a water flow into rotational power and generating electrical energy, and an improved bucket assembly resulting in the wheel having an increased power and force output in comparison to other similarly sized water wheels. In one aspect of the invention, the water wheel assembly includes a cylindrical wheel support frame which is rotatably connected to a horizontal shaft. The size and other particulars of the water wheel assembly may vary depending upon the intended use and location and can be modified for different water volumes. A plurality of uniformly distributed buckets (or troughs, compartments, containers, etc.) are coupled to the support frame in proximity to a periphery of the support frame. In some embodiments, the buckets are oriented and positioned on the support frame to receive fluid into the interior of the buckets from a chute or other flow positioned above the wheel. The buckets may be rectangular, curved or a combination of shapes which facilitate the water entering the buckets with a minimum of splashing. In some embodiments, the buckets have an irregular quadrilateral shape which includes a bottom wall, opposite side walls, a rear wall, an outwardly angled front wall, a top wall which extends over a rearward section of the bucket, and a mouth or top opening formed in a forward section of the bucket.

A containment flap is hingedly coupled to the bucket front wall and is pivotable to allow water to either freely pass into the bucket or to restrict water from exiting the bucket through the top opening. The containment flap preferably does not pivot outwardly beyond the top opening of the bucket. In some embodiments the distal end of the containment flap extends under the forward edge of the bucket top wall, while in other embodiments an additional member is coupled to the distal end of the flap. At least a portion of the containment flap or an attachment to the containment flap is constructed to have a lower density than the liquid filling the buckets, such that the containment flap will float on the surface of the water in the water-filling or filled buckets. In some embodiments, the flap may be constructed at least partially of a material having a lower density than water, while in other embodiments the flap may be at least partially filled with air, so that the flap will float on the water surface. In addition, spaces or openings are provided in and around the containment flap through which water can exit the buckets as a result of gravitational forces as the bucket is being lowered. In some embodiments, the spaces comprise slots formed between the containment flap and the bucket side walls, the size of which slots are calculated to allow the water to substantially completely empty from the buckets before they reach the lowest point on the wheel.

When the buckets are empty and positioned just past the top of the wheel ready to be filled, the front wall of the buckets will be angled upwardly. The containment flap will be hanging downwardly in the interior of the buckets, such that the top opening is not substantially restricted by the containment flaps. Initially, the force of some of the water entering the top opening will push against the outer wall of the containment flap and cause it to swing open further. The water will first fill the rearward section of the buckets, and when the rearward section is filled, the water will start filling the forward section. As the forward section is filled, the containment flap will gradually cover the top opening as it floats on the water surface. As the buckets are sequentially filled, the weight of the water-filled buckets will cause the wheel to rotate in a direction such that the water-filled buckets are lowered. The containment flap will reduce water waste due to water splashing out of the buckets during filling, and will contain a greater volume of water in the buckets until a bucket is close to the lowest position on the wheel, producing added force and increasing the efficiency of the wheel. The rate of water discharge from the buckets can be controlled by changing the size of the slots or other openings in and around the flaps. In addition, the containment flaps can be made tighter or looser.

In some embodiments, the buckets are also slidably coupled to the support frame, and are slidable radially outwardly from the shaft axle between a fully extended position and a fully non-extended or retracted position, wherein the radially non-extended position defines a first radius with respect to the wheel shaft, and the radially extended position defines a second radius with respect to the wheel shaft, which second radius is greater than the first radius. The buckets will extend radially outwardly when filled with water and when rotating downwardly on the wheel, and will retract when emptied and rotating upwardly on the wheel. When the water-filled buckets are in an extended position, a greater force and positive difference in torque is provided with respect to the water wheel shaft, further improving the efficiency and power of the water wheel. In some embodiments, the buckets may slide outwardly beyond the peripheral edge of the support wheel with respect to the center shaft of the wheel support frame.

In some embodiments, the buckets are secured to a heavy-duty slide assembly mounted to the wheel frame support. The slide assembly in one embodiment includes a pair of aligned rails which are secured to the wheel support frame and are angled radially outwardly, and a pair of extension members each of which is slidably connected to one of the rails. Each of the buckets will be mounted to one of the pairs of extension members. When the wheel is rotated and the water-filled buckets are being lowered, gravity will cause the buckets to slide outwardly on the rails. In some embodiments, struts may connect between the buckets and the wheel structure to support the buckets on the rails, such that when the buckets are emptied and have rotated past the lowest position on the wheel, the struts will aid in slidably returning the buckets back into a non-extended position as they are rotated upwardly on the wheel. Other arrangements for facilitating return of the emptied buckets from an extended position to a non-extended position may be utilized, including heavy springs or elastic cords. In some embodiments, adjacent leading and trailing buckets or compartments may be connected together with a resilient member such as a heavy bungee cord, such that as the leading bucket is returned to a non-extended position it will pull the adjacent trailing compartment back into a non-extended position. In another embodiment, one or more heavy springs, elastic cords or bands may be individually connected between the wheel frame and bucket, wherein the springs, cords or bands are tensioned such as to allow the water-filled buckets to slide outwardly on the support rails and to be retracted at least partially by the tension bands when emptied.

In combination, the bucket containment flaps and radially extendable buckets provide a greatly improved, more efficient water wheel design.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
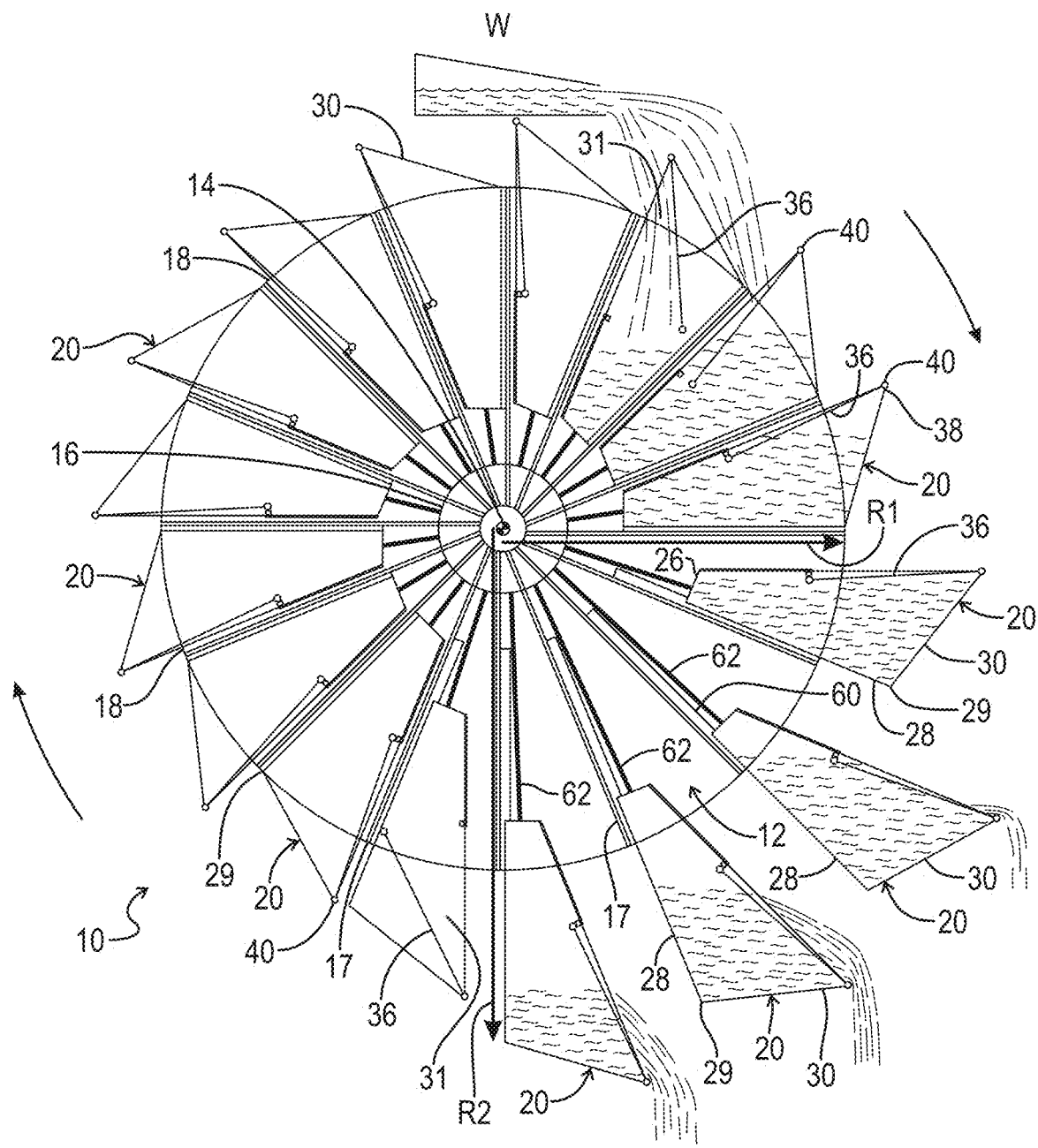
FIG. 1 is a diagrammatic side elevation view illustrating the water wheel assembly of the present invention.

Reference will now be made in detail to embodiments of the present invention, examples of which are illustrated in the accompanying drawings. While the present invention will be described in conjunction with the several embodiment(s), the description is not intended to be understood in a limiting sense, but to be an example of the invention presented solely for illustration thereof, and by reference to which in connection with the following description and the accompanying drawings one skilled in the art may be advised of the advantages and benefits of the invention. On the contrary, the present invention is intended to cover alternatives, modifications, and equivalents, which may be included within the spirit and scope of the invention as defined by the appended claims. Further, it will be appreciated that embodiments of the present disclosure may employ any combination of features described herein. Descriptions of well-known starting materials, equipment, components, and processing techniques may be omitted so as to not unnecessarily obscure the embodiments herein.

In the description of the present invention, it should be understood that the terms "upper," "lower," "top," "bottom," "left," "right," and the like refer to orientations or positions based on those shown in the drawings. The terms are only for the convenience and simplification of the description of the present invention, rather than indicating or implying that the device or element referred to must have a specific orientation, or be constructed and operated in a specific orientation. The terms "first" and "second" do not represent the importance of components, and therefore cannot be construed as limiting the present invention. The specific dimensions used in describing the exemplary embodiments are only for illustrating the technical solution without limiting the protection scope of the present invention. Reference herein to a "first embodiment," "an embodiment," "another embodiment," and like terms means that a particular feature, structure, or characteristic described in connection with the embodiment is included in at least one embodiment of the disclosure. The phrases "in an embodiment" or "in one embodiment" as used herein are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," "joined," or any variant thereof, means any connection or coupling, either direct or indirect, between two or more elements. Additionally, the words "herein," "above," "below," and words of similar import, when used in this document, shall refer to this document as a whole and not to any particular portions of this application. If the specification states a component or feature "may," "can," "could," or "might" be included or have a characteristic, that particular component or feature is not required to be included or have the characteristic.

As used herein, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "exemplary" is intended to mean "by way of example" and is not intended to indicate that a particular exemplary item is preferred or required.

When terms such as "first" and "second" are used herein to modify a noun, such use is simply intended to distinguish one item from another and is not intended to require a sequential order unless specifically stated.

FIG. 1 illustrates diagrammatically a wheel assembly 10 in accordance with the present invention, which assembly comprises a component of a hydropower device for generating electrical energy. Assembly 10 comprises a vertically mounted cylindrical wheel framework 12 having a horizontal central axle 14 and a central hub 16 which rotates with the central axle 14. Axle 14 may be operably connected to one or more gear boxes such that the rotation of the wheel framework drives the gear box. The wheel framework 12 further includes a pair of identical vertically oriented wheels, only one of which is shown, each having a central hub and axle. The wheel framework 12 is secured to a support structure (not shown) of the water wheel assembly 10 and can be made of a suitable material including but not limited to metal, wood, plastic, or a combination of materials. A plurality of radial arms or rails 17 extend radially outwardly from the hub 16 and connect to an outer circular rim or perimeter 18 of the wheels.

A series of evenly spaced apart buckets (also troughs, containers, etc.) 20 are peripherally mounted to the struts 17 of the wheel framework 12 and are connected between the identical wheels of the framework. In some embodiments, the buckets 20 may be connected directly to the wheel framework 12 by a suitable arrangement including but not limited to welding or bolting to the framework, while in FIG. 1 the buckets 20 are shown supported on a slide structure connected to the wheel framework, described below. The buckets 20 are arranged and similarly oriented to receive an amount of water passed into the buckets from a fluid flow source W, and may include a chute for directing the fluid to a desired fill location. The buckets 20 may be sized to receive different volumes of fluid and may be constructed of any suitable material such as metal or plastic, and may have rectangular shaped walls, or alternatively the bucket walls may have other shapes including but not limited to a rounded shape which is intended to limit splashing.

In one aspect of the invention, as shown in FIG. 1, wheel assembly 10 has an overshot water wheel configuration wherein the source water flow W is positioned at the top of the wheel, while in other embodiments assembly 10 could be a different type of gravitational wheel assembly such as a breastshot wheel. Wheel framework 12 may have different diameters and dimensions depending upon the head, or height of the source water flow as compared to the tail flow. In an embodiment of water wheel assembly 10, framework 12 has a diameter of 6 feet, such that the radius R1 of wheel 12 from the central axis of axle 14 to rim 18 is 3 feet. In other embodiments, wheel 12 may have a diameter of between four feet and 16 feet, depending again on the head and other conditions of use of the wheel assembly. In FIG. 1, the wheel framework 12 is caused to rotate about axle 14 by the force and weight of the water W passing into the buckets 20 when positioned near the top of the wheel. As oriented in FIG. 1, wheel assembly 10 is configured to rotate in a clockwise direction, while in other embodiments the wheel assembly 10 may be configured to rotate in a counterclockwise direction. Particularly in overshot wheel assemblies, the efficiency of the wheel is increased if water is received in the buckets close to the highest point of the wheel and discharged as near as possible to the lowest point of the wheel.

Figure 2:
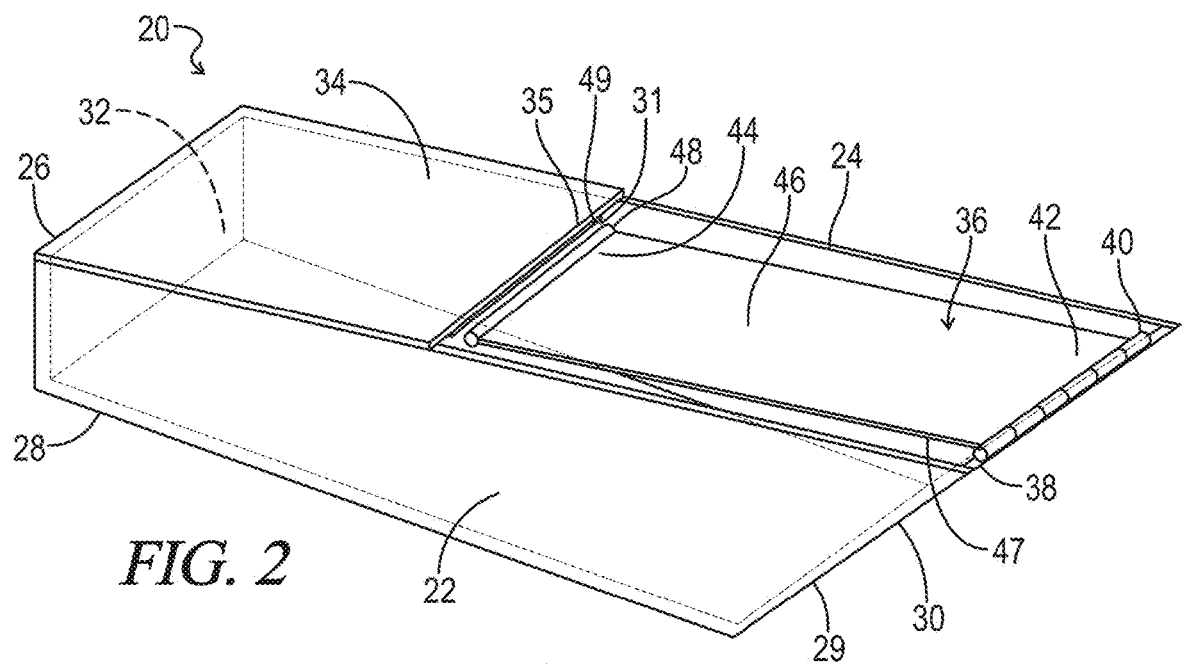
FIG. 2 is an isometric view from the top of an embodiment of a water wheel bucket in accordance with the present invention.
Figure 3:
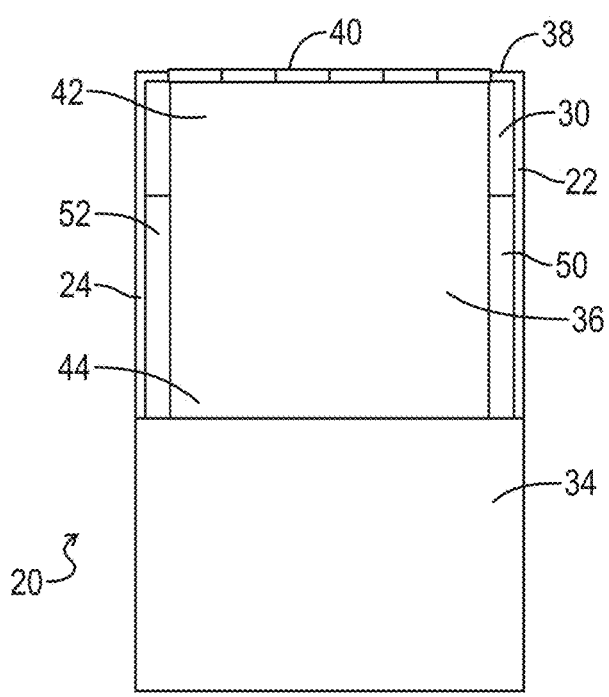
FIG. 3 is a top plan view of the bucket shown in FIG. 2.
Figure 4:
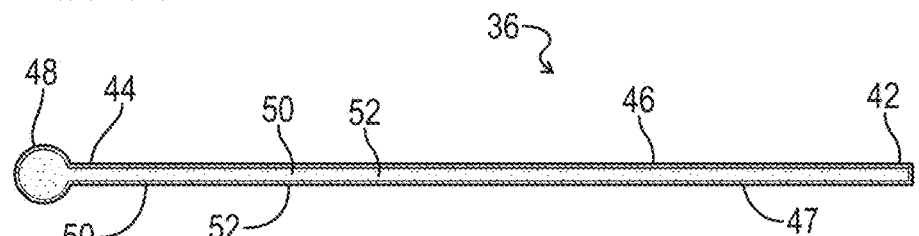
FIG. 4 is a cross-sectional view of an embodiment of one of the containment flaps forming a component of the invention.

Referring to FIGS. 2-4, additional features of an embodiment of the buckets 20 of the wheel assembly 10 are shown. In FIG. 2, one of the buckets 20 is illustrated as being translucent only to better illustrate its features. Each bucket 20 has an assembly which includes opposite side walls 22 and 24, a rear wall 26, a bottom wall 28, and a front wall 30, forming an interior space 32 in which water is received. Bucket 20 also has a top wall 34 which is connected to rear wall 26 and side walls 22 and 24 and extends over a rearward section of the bucket 20. An opening 31 is formed in the forward section of the bucket 20 through which fluid is passed or received into an interior of the bucket 20. In some embodiments, opening 31 is considered to be formed in the top wall 34. In some embodiments, as shown in FIGS. 2-3 front wall 30 is connected to bottom wall 28 at an obtuse angle, and front wall 30 has a greater length than rear wall 26. In the embodiment shown in FIG. 1, lower front edge 29 is substantially aligned with rim 18 of the wheel structure 12 when the bucket 20 is in a fully retracted position, and front wall 30 of bucket 20 extends beyond rim 18 of the wheel frame structure 12.

Figure 7:
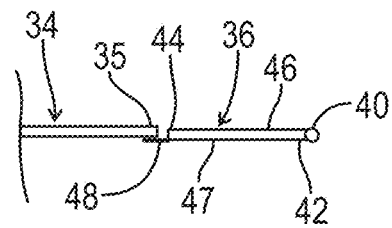
FIG. 7 is a side elevation view of another embodiment of the containment flap stop arrangement.

Bucket 20 also comprises a containment flap 36 which is pivotally secured on proximal end 42 to the bucket 20 at or near to the upper edge 38 of front wall 30 in a suitable manner such as by a hinge 40 coupled between the proximal end 42 and front wall 30. Containment flap 36 further comprises a distal end 44, an outwardly facing surface 46 and an inwardly facing surface 47. In some embodiments, containment flap 36 also includes a stop 48 on distal end 44 such as shown in FIGS. 4 and 7 which may be integrally formed with flap 36 or provided as a separate attachment. Containment flap 36 has a length from proximal end 42 to distal end 44 such that at least the stop 48 extends beyond and underneath the forward edge 35 of top wall 34. Stop 48 is shown as having an enlarged round or oval shape in FIGS. 2 and 4, while in FIG. 7 stop 48 is shown as a rectangular extension. Stop 48 therefore may have any suitable shape including rectangular, ribbed, etc. while falling within the intended scope of the invention. In some embodiments, an additional stop 48 is not provided and containment flap 36 will be dimensioned for the distal end 44 of containment flap 36 to extend under top wall 34. A lip 49 or other contact member may be provided on the underside of top wall 34 against which the stop 48 of containment flap 36 will contact when the flap 36 is pivoted against top wall 34. In some embodiments, stop 48 and/or contact member 49 of the containment flap 36 may comprise a shock or impact absorbing material which reduces the repeated forces of the flap 36 rotating into contact with the top wall 34, such as neoprene, rubber, polyurethane, silicone, or other materials. As shown in FIG. 4, stop 48 also may be enlarged on both the inwardly and outwardly facing surfaces 46 and 47, such that the stop 48 will also come into contact with an inner wall of the bucket 20 when the flap 36 swings open.

Containment flap 36 may be formed of any suitable rigid material such as plastic, fiberglass, a corrugated board material, aluminum, wood etc. Containment flap 36 is able to pivot freely on hinge 40 between a fully open position in which the distal end 44 of flap 36 is against the inner bottom wall 28 of bucket 20, and a fully closed position in which stop 48 is in contact with lip 49 on the underside of top wall 34. As a result, the distal end 44 of flap 36 is prevented from pivoting outwardly past top wall 34 of the bucket 20. In some embodiments, another means for preventing the flap 36 from pivoting beyond top wall 34 of the bucket 20 may be provided, such as a slotted slide bracket coupled to one or both side walls of the bucket and to the flap. Flap 36 is centered between side walls 22 and 24 of the bucket 20 on hinge 40. As best shown in FIG. 3 in which the flap 36 is shown in a fully closed position extending over opening 31, in some embodiments flap 36 has a width that is less than the width of the bucket interior between side walls 22 and 24. As a result, a slot 50 is formed between side wall 22 and containment flap 36, and another similarly sized slot 52 is formed between side wall 24 and containment flap 36.

Referring again to FIG. 1, after each bucket 20 is fully emptied of fluid at the bottom or lowest point of the wheel assembly 10, the distal end 44 or enlarged end portion 48 of containment flap 36 will pivot to a position resting against the interior wall 28 of the bucket 20. In other embodiments, depending upon the particular dimensions of the buckets 20, containment flap 36 might also rest against the front wall or another interior wall. As the buckets 20 gradually rotate upwardly or ascend with the wheel assembly 10, the buckets 20 will pivot and the position of opening 31 will gradually change from facing to one side, to facing downwardly, and then to facing to the opposite side. As a result, containment flap 36 will pivot on hinge 40 from a fully open position with the distal end 44 or stop 48 resting on floor 28 of bucket 20, to a fully closed position with the distal end 44 or stop 48 resting against the underside of the top wall 34 or against member 49. As the buckets 20 reach a position at the top of the wheel assembly 10, the containment flap 36 will be hanging straight downwardly. Once the buckets 20 start to descend or rotate downwardly on the opposite side of the wheel assembly 10, opening 31 will gradually rotate to face upwardly, while containment flap 36 will remain hanging substantially straight downwardly due to gravitational forces, and the flap 36 will gradually pivot away from top wall 34 of bucket 20 into an open position. A fluid flow W is introduced into the interior of the buckets 20 from a position above the wheel assembly 10, starting at or just beyond the topmost position of the wheel assembly 10. Initially, a majority of the fluid flow W will fall directly through opening 31 into the interior of the buckets 20 and will collect in the rearward section of the buckets defined between top wall 34, rear wall 26, and bottom wall 28. The fluid flow W may fill multiple buckets 20 at one time, and in some embodiments the buckets 20 may be situated such that the buckets partially overlap. In addition, depending on the horizontal force of the fluid flow W, a substantial volume of the fluid flow upon entering the buckets 20 may initially contact the outwardly facing surface 46 of the containment flap 36 before falling and collecting in the rearward portion, allowing the fluid to fill bucket 20 quickly. Until the rearward section of the buckets 20 is full, fluid hitting surface 46 of flap 36 will cause the flap 36 to pivot further away from front wall 34.

Once the rearward section of the buckets 20 is filled with fluid, the forward section adjacent mouth or opening 31 will then start filling. Containment flap 36 is configured to move to the surface of the fluid in the forward section of the buckets 20 as the forward section is filled. In some embodiments, the containment flap 36 comprises a buoyant material, while in other embodiments, either a buoyant material or a buoyant member or members is connected to the containment flap 36. The outwardly and inwardly facing surfaces 46 and 47 of the containment flap 36 are sufficiently rigid to support the force and weight of fluid exerted on the flap 36. In one embodiment, containment flap 36 may comprise an inner Styrofoam material, while in another embodiment as shown in FIG. 4, containment flap 36 may have a hollow interior 50 which is filled with air 52 or another suitable gas. An inner bladder or liner for containing the gas may also be provided. In some embodiments, the end stop 48 alone may be air-filled or alternatively may be provided as a Styrofoam member which is secured to the distal end 44 of the containment flap 36 and is sufficient for the containment flap 36 to float on the fluid surface in the buckets 20.

The buckets 20 including the containment flap 36 are particularly designed to reduce input power losses that occur during filling of the buckets due to the impact of the fluid with the buckets by reducing fluid splashing out of the buckets, such that the buckets can be filled more quickly and efficiently. In some embodiments, the fluid may be water, while in other embodiments may be an oil or similar material. The bucket design also reduces outflow power losses resulting from fluid spilling out of the buckets while rotating downwardly or descending on the wheel framework 12 toward the lowest position on the wheel. The containment flap 36 on the buckets 20 thus reduce power losses by maintaining the fluid and therefore the fluid weight in the buckets for a longer period. Providing the front wall 30 of the buckets 20 at an acute outward angle such that the front wall 30 extends past the rim 18 of the wheel framework 12 facilitates ease of filling of the buckets 20 through opening 31 in the forward section of the buckets. As shown in FIG. 1, at the highest point on the wheel, the buckets 20 are pivoted upwardly, with rear wall 26 of the buckets 20 being horizontally disposed, side walls 22 and 24 being vertically disposed, the front wall 30 is angled downwardly in the direction of rotation of the wheel, and the containment flap 36 will be hanging vertically downwardly on hinge 40. At a position just past the highest point on the wheel, the containment flap 36 will start to open such that fluid W can now pass into the bucket 20, and the containment flap 36 can pivot open further in response to the force of the fluid flow W against the upper face 46 of the containment flap 36. The rate of the fluid flow W and speed of the wheel rotation can be adjusted such that in some embodiments the buckets 20 will be substantially filled by the time each bucket 20 reaches about a $1/8^{th}$ rotation from the highest point on the wheel. As the forward portion of the buckets 20 start to fill, the buoyant containment flap 36 will pivot in accordance with the fluid level in the bucket.

Referring again to FIG. 1, as the wheel assembly continues to rotate, the buckets 20 containing fluid will gradually rotate downwardly on the wheel. Until the buckets 20 reach the horizontal midpoint of the wheel, the bottom wall 28 of the buckets 20 will be at least partially angled downwardly towards rear wall 26. Containment flap 36 will pivot in response to the level of the fluid in the buckets 20. At the horizontal midpoint, in the present embodiment the upper edge 38 of the front wall 30 is higher than the fluid level in the bucket. Agitation and splashing of the water in each bucket 20 is reduced by top wall 34 and the closed containment flap 36, and fluid is substantially prevented from flowing out of the buckets 20 until the individual bucket is tipped past horizontal. Once the buckets 20 rotate downwardly past the horizontal midpoint of the wheel, bottom wall 28 will start tilting downwardly towards front wall 30. This will cause the fluid weight in the buckets 20 to shift away from the rearward end and towards the forward end and front wall 30 of the buckets. This force will keep containment flap 36 closed and continue to inhibit fluid from pouring out of the buckets, such that the fluid can only exit the buckets through the spaces, or more particularly in FIG. 2 slots 50 and 52 formed between the side walls 22 and 24 of the bucket and the side edges of the containment flap 36. As shown in FIG. 1, as the buckets 20 tilt further downwardly, a greater amount of fluid will exit through the slots 50 and 52, while flap 36 remains closed. The size of the slots 50 and 52 may be increased or adjusted so that all of the fluid has exited the buckets 20 by the time each bucket reaches the lowest position on the wheel, or just past this point. This prevents any further power losses due to uplifting of water still in the buckets past the lowest position.

As described, the containment flap 36 will extend over the top opening 31 in the buckets 20 and will float on the top surface of the water in each bucket 20 as the buckets are filled. The top wall 34 over the rearward portion of the bucket 20 reduces the amount of water splashing out of the interior 28 of bucket 20 during filling. In addition, the top wall 34 in combination with the containment flap 36 reduces splashing of the water housed in bucket 20 during rotation of the wheel assembly 10, and maintains a greater amount of fluid in the buckets as they rotate around the wheel assembly. In some embodiments, the slots or gaps 50 and 52 between the containment flap 36 and side walls 22 and 24 of the bucket 20 may be other than slot-shaped, while in other embodiments additional openings may be provided in the containment flap 36 through which some of the exiting fluid can pass to ensure the buckets are empty as they reach the lowest position on the wheel.

Figure 5:
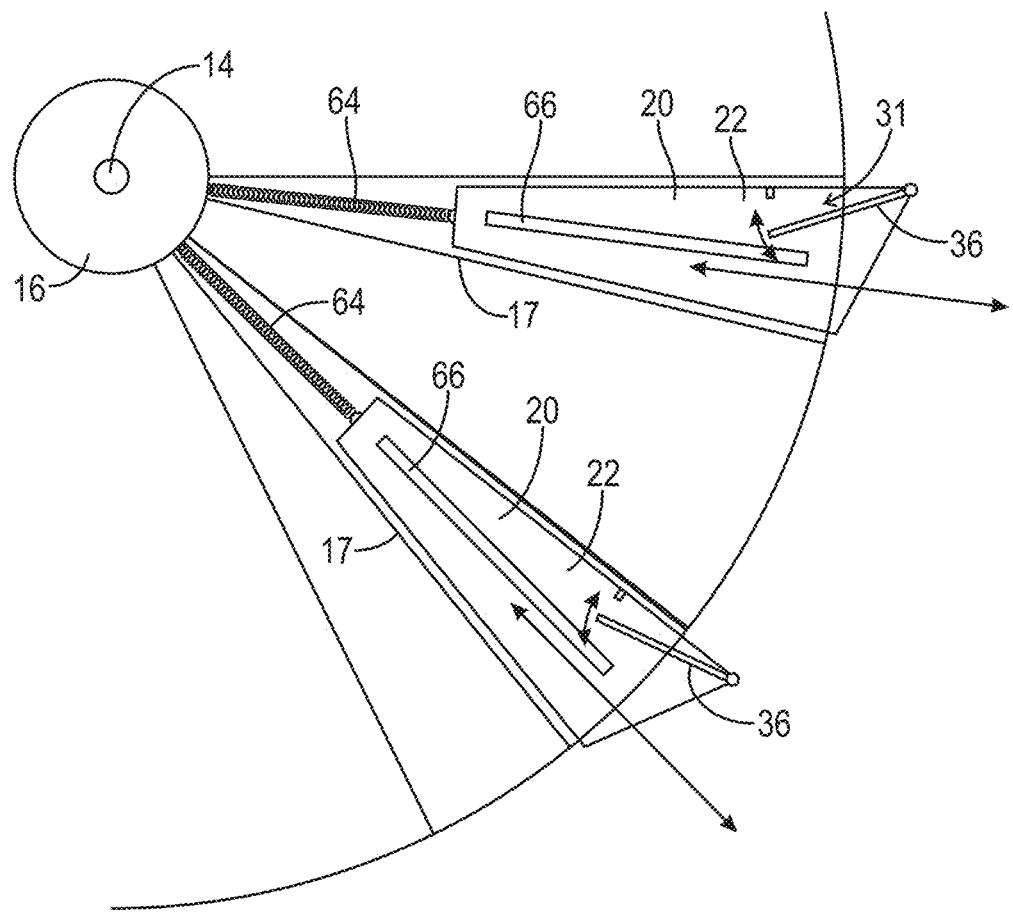
FIG. 5 is a side elevation view of a bucket slide arrangement in accordance with the present invention.
Figure 6:
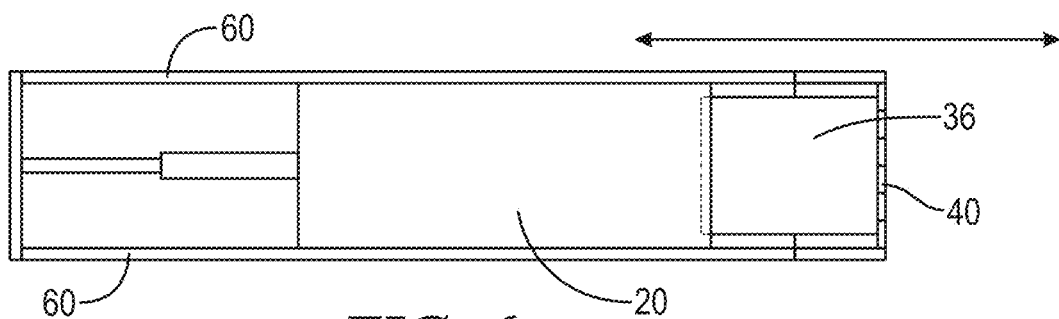
FIG. 6 is a top view of a bucket and slide track.

Referring now to FIGS. 1, 5, and 6, in the illustrated embodiment the buckets 20 are slidably mounted to wheel framework 12 so as to be capable of sliding radially outwardly with respect to the wheel hub, and thus movable between a retracted position and an extended position. In one embodiment, the buckets 20 are coupled to a rail assembly 60 which is attached to the wheel framework 12. As shown in FIG. 1, in a fully retracted position, the outer edge 29 of the bottom wall 28 of the buckets 20 is preferably substantially aligned with the outer rim 18 of wheel framework 12, which has a radius R1. The buckets are movable into an extended position when filled with fluid and rotating downwardly past horizontal, and will slide radially outwardly on rails 60 away from the outer rim 18 of the wheel framework and hub of the wheel 10. When extended, the distance between the lower edge 29 of the buckets 20 and axle 14 has a second radius designated as R2 in FIG. 1, wherein R2 is greater than R1. In one embodiment, in a fully extended position, the buckets 20 extend outwardly from radius R1 of the wheel framework 12 an additional length of about 30 inches. Thus, where radius R1 of the water wheel 12 is three feet or thirty-six inches, R2 for each bucket 20 in a fully extended position is sixty-six inches. It will be evident to those skilled in the art that R1 and R2 may be configured to have different lengths depending upon the size of the water wheel structure, the desired extension, the bucket size, and other variables.

Rail assembly 60 in an embodiment is a telescopic slide rail mounted on each side of the bucket, which includes a rail portion connected to the wheel assembly and a slide extension portion to which the bucket is mounted and which is connected to the rail portion to be longitudinally movable relative to the rail portion. In some embodiments, the length the slide extension portion can extend with respect to the rail portion may be adjusted. Two rail assemblies will be used to slidingly mount each bucket to the wheel framework 12, as shown in FIG. 6. The rail portion will be mounted to one of the struts 17 of the wheel framework 12, and the slide extension portion is mounted to a side or lower wall of the bucket 20. As soon as a bucket 20 is tilted to be angled downwardly on the wheel, this bucket 20 will automatically begin to slide outwardly on rails 60 due to gravity. The buckets 20 may be additionally mounted on wheels to facilitate such radial movement. In addition, a means for returning the buckets 20 to a retracted position may also be provided. In some embodiments, one or more resilient members such as elastic cords 62 which may be a bungee or other cord are connected between the bucket 20 and the wheel framework 12. Elastic cords 62 will have a length and tension such that when the buckets 20 are filled with water and tilted downwardly on the wheel, the buckets 20 will be able to slide outwardly into a fully extended position against the cord tension. As the buckets 20 slide outwardly, the tension on the cords 62 will increase which will prevent the buckets 20 from accelerating too fast, reduce wear and tear on the rails 60. In other embodiments, heavy springs, or struts 64 (FIG. 5) may be provided instead of cords. Tracks 66 may also be provided on the side walls 22, 24 of the buckets to facilitate sliding movement of the buckets.

By slidably moving the buckets 20 into an extended position, the torque or moment (which is a vector quantity of force which causes an object to rotate about an axis), of the buckets 20 about the horizontal axle 14 of the water wheel 12 is increased. The Torque (T) about a point (p) is equal to the Force (F) times the distance or moment arm (L), assuming the Force (F) is perpendicular to the force. In wheel assembly 10, the Force (F) is the downward force of the fluid-filled buckets 20, which is in general a constant downward force. The distance (L) measured perpendicular to the force is the length R1 or R2 between the horizontal axis 14 of the water wheel 12 and the outer wall of the buckets 20. It can be readily seen therefore that if the distance (L) is increased, the Torque (T) will be correspondingly increased, and therefore extending the buckets 20 outwardly will increase the Torque (T) with the same Force (F) applied by the fluid-filled buckets 20. As a result, the overall power of the wheel assembly 10 is increased by extending the buckets 20.

Once the buckets 20 have rotated beyond the lowest position on the wheel and are empty, as shown in FIG. 1, without the extra weight of the fluid, in some embodiments the tension of the cords 62 is calculated to be sufficient to cause the buckets 20 to begin moving from a fully extended position to a retracted position. To maximize the efficiency of the wheel W, the buckets 20 should be moved from an extended position to a retracted position as quickly as possible after the water is emptied, to decrease moment arm or R2 of the buckets before rotating upwardly. In other embodiments, other means for controlling sliding movement of the buckets 20 such as a hydraulic system may be provided, which will be connected to an electronic control system for the water wheel assembly. In some embodiments, adjacent buckets may be connected by a heavy bungee cord or the like such that as the front bucket is pulled inwardly the bungee cord will engage and cause the next successive bucket to also be pulled inwardly. In other embodiments, the buckets 20 may be made of a durable yet lightweight material to minimize the weight of the buckets and force required to move them back into a retracted position. As indicated above, heavy springs or struts connecting between the buckets and wheel structure may also be alternatively utilized. The desired spring tension can be adjusted in accordance with the particular dimensions and weight of the buckets, as well as the water volume supplied to the water wheel assembly.

Figure 8:
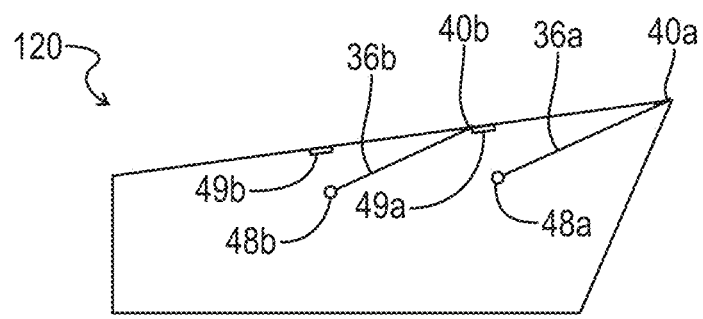
FIG. 8 is a diagrammatic side elevation view of another embodiment of the hydropower wheel bucket assembly.

FIG. 8 illustrates another embodiment of the water wheel bucket assembly of the present invention. The bucket 120 is identical in structure to the bucket 20 shown in FIG. 2, except that bucket 120 has two containment flaps 36a and 36b mounted to the bucket rather than a single containment flap 36. Containment flap 36a is pivotally mounted to the top edge of angled front side wall of the bucket by hinge 40a. A retaining member 49a is coupled to one or both side walls of the bucket 120 and is positioned to abut with stop 48a on the distal end of the containment flap 36a as the containment flap 36a pivots outwardly on hinge 40a. In some embodiments, retaining member 49a is a cross member connecting between the side walls, although other arrangements for preventing the flap 36a from pivoting beyond the top edge of the bucket 120 may be provided, such as a cord attached between the distal end of the flap 36a and an interior of the bucket, wherein the cord has a length which restricts the pivoting movement of the flap 36a to range within the interior of the bucket. In addition, another containment flap 36b is hingedly connected between the side walls of the bucket at a location slightly rearward of retaining member 49a as shown in FIG. 8 by hinge 40b. In some embodiments, a pair of inwardly protruding members may be formed in the side walls of the bucket 120, which are sized to be received in corresponding receiving openings in the outer ends of a pivot member to which the containment flap 36b is connected. A stop 48b is provided on the distal end of flap 36b, and another retaining member 49b is provided against which in some embodiments the stop 48b will abut and be prevented from pivoting out of bucket 120. The embodiment shown in FIG. 8 may be desirable for use on buckets in various situations, such as those having longer dimensions, or where a larger top opening in the bucket assembly is required.

The rotating shaft of the water wheel assembly may be connected to a generating mechanism for converting mechanical energy into electrical energy in a manner known to those skilled in the art, or, alternatively, used for other purposes. By increasing the volume of water in each bucket while also holding the water in the bucket for a longer period before emptying near the lowest position on the wheel, and further by extending or sliding the water-filled buckets outwardly while retracting the empty buckets, the rotational speed of the wheel may be increased resulting in a more efficient wheel assembly in accordance with the present invention. By providing a radially sliding bucket or compartment the water weight can be shifted outside of the wheel dimensions, increasing the weight by lever action, and repositioning the mass by extending the bucket position to create more force. In some embodiments, the buckets will slide radially between 12 inches and 30 inches depending on the particular design. In an embodiment, using a six-foot wheel with a 30-inch slide will perform like an eleven-inch wheel with an increase in force of around 80%. With the containment flaps provided over the movable buckets the fluid will be held in the buckets for a longer period, helping produce an even greater force. In some embodiments, the containment flaps are filled with air to float while still being sufficient rigid to hold the water weight in the buckets attempting to flow out of the buckets during a downward rotation of the wheel. The containment flaps can be used on a variety of different bucket configurations.

The foregoing description has been presented for purposes of illustration and description and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A hydropower device comprising:
    a wheel assembly including a framework mounted on a horizontal axle and having radial arms and a circumferential rim; and
    a series of buckets adapted to receive a fluid into an interior of the buckets coupled to the radial arms and circumferentially spaced around an outer periphery of the wheel assembly;
    the buckets having an outwardly angled front wall, opposite side walls, a bottom wall, a rear wall, a top wall, a fluid receiving opening adjacent the top wall, a hinged containment flap coupled to an outer edge of the front wall and configured to pivotably extend over the fluid receiving opening, said containment flap being inwardly openable and comprising a buoyant material such that the containment flap will float on the fluid placed in the buckets, and open slots formed on opposite sides of the containment flap between outer side edges of the containment flap and opposite side walls of the buckets, the slots dimensioned to allow drainage of the fluid from the buckets during a descending movement of the buckets on the wheel assembly.

2. The hydropower device of claim 1 wherein each bucket in the series of buckets is slidably mounted to the radial arms of the wheel assembly and the buckets are slidable between an extended position and a retracted position.

3. The hydropower device of claim 2 additionally comprising a slide rail system for slidably mounting the buckets to the radial arms of the wheel assembly.

4. The hydropower device of claim 3 additionally comprising a means for returning the buckets to said retracted position.

5. The hydropower device of claim 4 wherein said means for returning the buckets to said retracted position includes at least one elastic member connecting between each bucket of the series of buckets and the framework of the wheel assembly.

6. The hydropower device of claim 4 wherein said means for returning the buckets to said retracted position includes at least one spring member connecting between each bucket and the framework of the wheel assembly.

7. The hydropower device of claim 4 wherein said means for returning the buckets to said retracted position includes a strut connected between the framework of the wheel assembly and the buckets.

8. The hydropower device of claim 2 wherein an upper edge of the front wall of the buckets is angled outwardly from the circumferential rim of the framework of the wheel assembly when the buckets are in said retracted position.

9. The hydropower device of claim 1 wherein a lower edge of the front wall of the buckets is aligned with the circumferential rim of the framework of the wheel assembly when the buckets are in said retracted position.

10. The hydropower device of claim 1 wherein the wheel assembly is operably connected to drive a power generation system.

11. A bucket assembly for a hydropower device comprising:
    a series of buckets configured to be coupled to and circumferentially spaced around an outer periphery of a wheel assembly, each bucket of the series of buckets having a forward section and a rearward section defining an interior, a fluid receiving opening in the forward section for allowing a fluid flow into the interior, and a hinged containment flap secured to an outer end of the forward section;
    said containment flap being comprised of a buoyant material to enable floating on fluid in the interior of the bucket and being pivotable in the interior between a position restricting the fluid flow from entering the bucket and fluid in the interior from exiting the bucket through the fluid receiving opening and another position which does not restrict the fluid flow from entering the bucket through the fluid receiving opening; and
    one or more spaces formed between the containment flap and opposite edges of the fluid receiving opening, said one or more spaces being positioned and dimensioned to allow the fluid contained in the bucket to empty from the bucket through the one or more spaces during a descending movement of the bucket on the wheel assembly with the containment flap in a position restricting fluid from exiting the bucket through the fluid receiving opening.

12. The bucket assembly of claim 11 wherein the one or more spaces further comprises slots formed between the containment flap and the opposite edges of the fluid receiving opening.

13. The bucket assembly of claim 11 wherein the containment flap is restricted from pivoting to a position outside of the interior of the bucket.

14. The bucket assembly of claim 13 additionally comprising a bottom wall, rear wall, opposite side walls, a front wall connected at an acute angle to the bottom wall, and a top wall in the rearward section of the bucket connected extending over the rear and side walls, wherein the top wall is adjacent the fluid receiving opening.

15. The bucket assembly of claim 14 wherein the containment flap further comprises a proximal end and a distal end, and wherein the proximal end is connected to a hinge, and the containment flap is dimensioned so the distal end abuts against the top wall in the rearward section when pivoted to a position restricting fluid flow through the fluid receiving opening.

16. The bucket assembly of claim 15 additionally comprising a stop attached to the distal end of the containment flap.

17. The bucket assembly of claim 16 additional comprising a contact member attached to an underside of the top wall in a position to be in abutting contact with the stop on the containment flap when the containment flap is pivoted to the position restricting fluid flow through the fluid receiving opening.

18. The bucket assembly of claim 17 wherein the series of buckets is each slidably mounted to a radial arms of the wheel assembly and is slidable between an extended position and a retracted position.

19. The bucket assembly of claim 18 wherein the bucket is slidably mounted on a slide rail system.

20. The bucket assembly of claim 19 additionally comprising a strut attached between the buckets and wheel assembly for returning the buckets to said retracted position.

* * * * *